United States Patent
McDonald et al.

(10) Patent No.: US 11,500,643 B2
(45) Date of Patent: Nov. 15, 2022

(54) SPECTRE FIXES WITH INDIRECT VALID TABLE

(71) Applicant: CENTAUR TECHNOLOGY, INC., Austin, TX (US)

(72) Inventors: Thomas C. McDonald, Austin, TX (US); Timothy Jon Sulzbach, Austin, TX (US)

(73) Assignee: CENTAUR TECHNOLOGY, INC., Austin, TX (US)

( * ) Notice: Subject to any disclaimer, the term of this patent is extended or adjusted under 35 U.S.C. 154(b) by 0 days.

(21) Appl. No.: 17/098,195

(22) Filed: Nov. 13, 2020

(65) Prior Publication Data

US 2022/0156082 A1  May 19, 2022

(51) Int. Cl.
*G06F 9/38* (2018.01)

(52) U.S. Cl.
CPC .......... *G06F 9/3848* (2013.01); *G06F 9/3806* (2013.01)

(58) Field of Classification Search
CPC .................................................. G06F 9/3806
See application file for complete search history.

(56) References Cited

U.S. PATENT DOCUMENTS

| | | | | |
|---|---|---|---|---|
| 5,819,056 A * | 10/1998 | Favor | ................... | G06F 9/3812 712/204 |
| 2005/0132174 A1* | 6/2005 | Jourdan | ................ | G06F 9/3851 712/239 |
| 2011/0055529 A1* | 3/2011 | McDonald | .......... | G06F 9/30054 712/238 |
| 2013/0242677 A1* | 9/2013 | Iyer | ........................ | G11C 11/419 365/189.15 |
| 2013/0326198 A1* | 12/2013 | Meier | ................... | G06F 9/3834 712/216 |
| 2019/0286443 A1* | 9/2019 | Solomatnikov | ....... | G06F 9/3848 |
| 2020/0133679 A1* | 4/2020 | Brandt | ................ | G06F 9/30101 |

FOREIGN PATENT DOCUMENTS

| CN | 108427576 A | 8/2018 |
|---|---|---|
| CN | 111414321 A | 7/2020 |

OTHER PUBLICATIONS

Sohn et al, An implementation of branch target buffer for high performance applications, 1995, IEEE, 0-7803-2624-5/95, 4 pages (Year: 1995).*
Josh Fruhlinger: "Spectre and Meltdown explained: What they are, how they work, what's at risk"; Jan. 15, 2018; pp. 1-11; https://www.csoonline.com/article/3247868/spectre-and-meltdown-explained-what-they-are-how-they-work-whats-at-risk.html.
Matt Klein: "Meltdown and Spectre, explained"; Jan. 14, 2018; pp. 1-19; https://medium.com/@mattklein123/meltdown-spectre-explained-6bc8634cc0c2.

* cited by examiner

*Primary Examiner* — Keith E Vicary
(74) *Attorney, Agent, or Firm* — McClure, Qualey & Rodack, LLP

(57) ABSTRACT

In one embodiment, a microprocessor, comprising: a branch prediction table comprising plural entries, wherein at least a portion of the plural entries corresponds to an indirect branch type; and an indirect valid table; wherein based on an indirect branch instruction fetch, an entry corresponding to an indirect branch instruction in the branch prediction table is configured as invalid based on clearing a corresponding entry in the indirect valid table.

20 Claims, 5 Drawing Sheets

SPECTRE FIXES WITH INDIRECT VALID TABLE

TECHNICAL FIELD

The present invention relates in general to microprocessors, and in particular, Microprocessor security.

BACKGROUND

In early 2018, researchers published information on potential security vulnerabilities of microprocessors, and in particular, security flaws that could permit malicious code to expose privileged data (e.g., secret or private data, such as data belonging to other programs that are run on the microprocessor, data only available to an administrator, etc.) stored in computer chips. There are several variations of the security flaws, with two of them categorized under the general label of Spectre and the third referred to as Meltdown. These vulnerabilities arise through exploitation of speculative execution and caching mechanisms used in modern day microprocessors.

There are two variants of the Spectre vulnerability. The first, sometimes referred to as bounds check bypass, involves malicious code causing faulty speculation in a kernel mode and indirectly learning access patterns to cache memory and hence speculatively accessing kernel memory to access the privileged data. The second variant, sometimes referred to as branch target injection, uses indirect branch prediction to fool the microprocessor into speculatively executing into a memory location that it would not have otherwise executed. If executing those instructions can leave a state behind in the cache that can be detected using cache inference attacks, an attacker can then access the contents of kernel memory.

Published attempts to mitigate the Spectre vulnerabilities include static analysis and fencing for the first variant (variant I), and for the second variant (variant II), which is the focus of the present disclosure, microcode updates in the form of indirect branch restricted speculation (IBRS) and indirect branch predictor (sometimes, prediction) barrier (IBPB) as two notable mitigation techniques. IBRS prevents indirect branches in lower privilege level code from affecting predictions in higher privilege level code. IBRS has a variation where higher privilege level code also is prevented from affecting predictions in lower privilege level code (so an exact privilege level match is required). IBPB clears a branch target address cache (BTAC) for indirect branch speculation run across user mode or guest mode context switching.

SUMMARY

In one embodiment, a microprocessor, comprising: a branch prediction table comprising plural entries, wherein at least a portion of the plural entries corresponds to an indirect branch type; and an indirect valid table; wherein based on an indirect branch instruction fetch, an entry corresponding to an indirect branch instruction in the branch prediction table is configured as invalid based on clearing a corresponding entry in the indirect valid table.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Various aspects of the invention can be better understood with reference to the following drawings. The components in the drawings are not necessarily to scale, with emphasis instead being placed upon clearly illustrating the principles of the present invention. Moreover, in the drawings, like reference numerals designate corresponding parts throughout the several views.

DETAILED DESCRIPTION

Figure 1A:
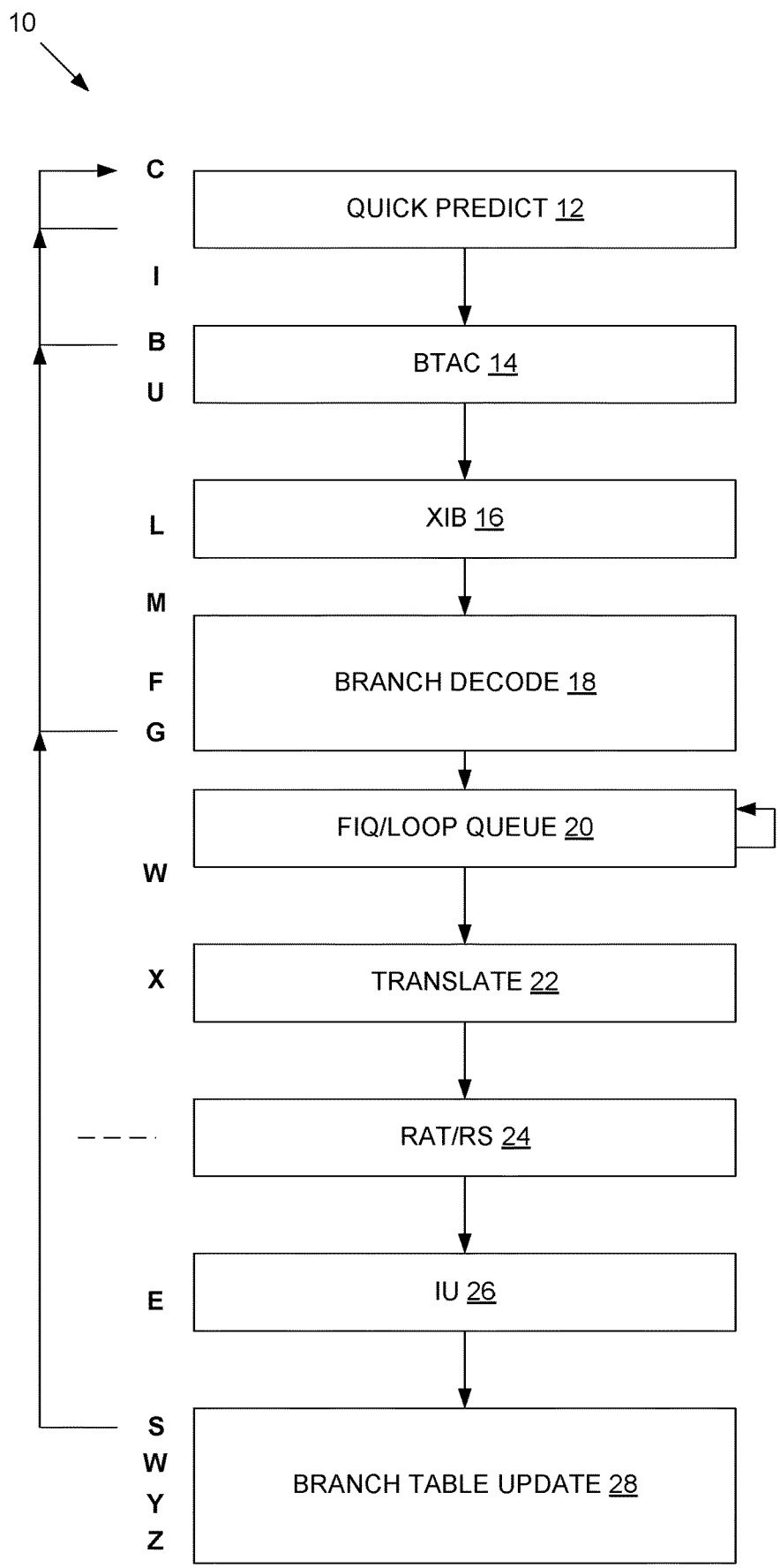
FIG. 1A is a block diagram showing an example branch unit pipeline for a microprocessor in which an embodiment of branch prediction security system is implemented.

Certain embodiments of a branch prediction security system and method are disclosed for a microprocessor that provide Spectre fixes based on Indirect Branch Restricted Speculation (IBRS) and Indirect Branch Predictor Barrier (IBPB) mitigation techniques. IBRS prevents indirect branches in lower privilege level code from affecting predictions in higher privilege level code. IBRS also has a variation where higher privilege level code also is prevented from affecting predictions in lower privilege level code (e.g., so an exact privilege level match is required). In one embodiment, a branch prediction security system implements IBRS by using an extra two (2) tag bits in a prediction table (e.g., branch target address cache or BTAC) entry to represent the plural (e.g., four (4)) privilege states that Intel® uses. Intel® refers to these 2 bits as the predictor mode, but does not disclose the presence of these bits in the BTAC. Rather, as best as can be understood, Intel® appears to clear a predictor when microcode transitions to a higher privilege mode, similar to IBPB. Additional information on privilege levels and predictor mode may be found in U.S. Patent Application Publication No. 20200133679, assigned to Intel®. An embodiment of the branch prediction security system causes a branch instruction to miss and not be predicted if it fails a privilege level test. IBPB clears indirect branches when transitioning from a lower to higher privilege code. In one embodiment, a branch prediction security system implements IBPB by adding a separate indirect valid table for indirect branch instructions. The indirect valid table may be cleared in a single clock cycle, since all bits are cleared concurrently. On a branch prediction table (e.g., BTAC) read, an indirect branch instruction should have a normal valid bit and also an indirect valid bit in order to be read as a branch instruction. The branch prediction table is configured as invalid based on a clearing of a corresponding entry in the indirect valid table.

Digressing briefly, IBRS and IBPB are two mitigation techniques for the Spectre II variant. However, implementation details have been left to each chip manufacturer. In some cases, hardware fixes have lead to performance issues, which is not unexpected since the speculative processing of modern day processors arose from the need to speed processing via hardware. Further, some techniques like IBPB, where indirect branches are cleared, are not feasible for large branch prediction tables, such as the BTAC. For instance, current BTACs may have four thousand (4k) entries (with multiple ways), each entry ninety (90) bits wide, with a mix of branch types interspersed and stored within. Clearing each of the valid bit entries (e.g., setting to zero), each cycle, for all branch entries consumes considerable power and is wasteful. Further, it is not feasible to create a table (array) that conditionally clears valid bit entries based on type data also stored in that table without sequentially reading every entry in the table, which is impractical due at least in part to the number of cycles required. In contrast, certain embodiments of a branch prediction security system circumvents these and/or other challenges by adding a (predictor mode) tag to the prediction table to enable a determination of whether a current predictor mode is equal to or greater than the predictor mode indicated by the tag, and/or using a small (e.g., plural rows of single bit entries in some embodiments, though additional entries per row or one or more additional small tables may also be used, such as an additional entry or table for a main valid entry normally in the BTAC to enable a quick clear) indirect valid table to clear the valid entries in a single clock cycle when transitioning between supervisor and user code, thus improving performance in terms of speed and efficiency when compared to other IBRS/IBPB methods.

Having summarized certain features of a branch prediction security system of the present disclosure, reference will now be made in detail to the description of a branch prediction security system as illustrated in the drawings. While a branch prediction security system will be described in connection with these drawings, there is no intent to limit it to the embodiment or embodiments disclosed herein. That is, while the invention is susceptible to various modifications and alternative forms, specific embodiments thereof are shown by way of example in the drawings and will herein be described in detail sufficient for an understanding of persons skilled in the art. It should be understood, however, that the drawings and detailed description thereto are not intended to limit the invention to the particular form disclosed. On the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, modules, circuits, logic, or other components may be described as "configured to" perform a task or tasks. In such contexts, "configured to" is a broad recitation of structure generally meaning "having circuitry or another physical structure that" performs, or is capable of performing, the task or tasks during operations. The circuitry may be dedicated circuitry, or more general processing circuitry operating under the control of coded instructions. That is, terms like "unit", "module", "circuit", "logic", and "component" may be used herein, in describing certain aspects or features of various implementations of the invention. It will be understood by persons skilled in the art that the corresponding features are implemented utilizing circuitry, whether it be dedicated circuitry or more general purpose circuitry operating under micro-coded instruction control.

Further, the unit/module/circuit/logic/component can be configured to perform the task even when the unit/module/circuit/logic/component is not currently in operation. Reciting a unit/module/circuit/logic/component that is configured to perform one or more tasks is expressly intended not to invoke 35 U.S.C. § 112(f) for that unit/module/circuit/logic/component. In this regard, persons skilled in the art will appreciate that the specific structure or interconnections of the circuit elements will typically be determined by a compiler of a design automation tool, such as a register transfer language (RTL) compiler. RTL compilers operate upon scripts that closely resemble assembly language code, to compile the script into a form that is used for the layout or fabrication of the ultimate circuitry.

That is, integrated circuits (such as those of the present invention) are designed using higher-level software tools to model the desired functional operation of a circuit. As is well known, "Electronic Design Automation" (or EDA) is a category of software tools for designing electronic systems, such as integrated circuits. EDA tools are also used for programming design functionality into field-programmable gate arrays (FPGAs). Hardware descriptor languages (HDLs), like Verilog and very high-speed integrated circuit hardware description language (VHDL) are used to create high-level representations of a circuit, from which lower-level representations and ultimately actual wiring can be derived. Indeed, since a modern semiconductor chip can have billions of components, EDA tools are recognized as essential for their design. In practice, a circuit designer specifies operational functions using a programming language like C/C++. An EDA software tool converts that specified functionality into RTL. Then, a hardware descriptor language (e.g. Verilog) converts the RTL into a discrete netlist of gates. This netlist defines the actual circuit that is produced by, for example, a foundry. Indeed, these tools are well known and understood for their role and use in the facilitation of the design process of electronic and digital systems, and therefore need not be described herein.

FIG. 1A shows an embodiment of an example branch unit pipeline for a microprocessor 10. It should be appreciated that certain known components of a microprocessor 10 are omitted here for brevity and ease of explanation and illustration. As is known, the pipeline architecture provides for multiple instructions that are overlapped in execution, with each stage referred to as a pipe stage. The blocks shown in the branch unit pipeline may each be implemented according to one or more stages, those stages shown to the left of the blocks and represented in the depicted embodiment by the upper-case letters C, I, B, U, L, M, F, G, W, X, E, S, W, Y, and Z that are sequentially advanced from top-down and as redirected (as shown by the arrows). It should be appreciated by one having ordinary skill in the art that the number and/or arrangement of stages depicted in FIG. 1A is merely illustrative of one example embodiment, and that in some embodiments, a different number and/or arrangement of stages may be implemented and hence contemplated to be within the scope of the disclosure. It should also be appreciated by one having ordinary skill in the art that the blocks provide a general description of functionality for the branch pipeline, and that associated logic or circuitry known to those having ordinary skill in the art is omitted here for brevity. For instance, it should be appreciated by one having ordinary skill in the art that each stage of the pipeline may be separated by clocked pipeline registers or latches, as is known. As another example, though not explicitly shown in FIG. 1A, it should be appreciated by one having ordinary skill in the art that operations at the front end involve data exchange or interaction with an instruction cache.

An instruction cache is a random access memory device within a microprocessor into which the microprocessor places instructions of an ISA machine language program (such as x86 ISA machine language instructions) that were recently fetched and/or pre-fetched from larger cache (e.g., L2 cache, L3 cache) or system memory (e.g., fetched and/or pre-fetched from DRAM by a bus interface unit) and performed by the microprocessor in the course of running the ISA machine language program. The ISA defines an instruction address register that holds the memory address of the next ISA instruction to be performed (defined by the x86 ISA as an instruction pointer (IP) though sometimes referred to as a program counter (PC)), and the microprocessor updates the instruction address register contents as it runs the machine language program to control the flow of the program. The ISA instructions are cached for the purpose of subsequently fetching, based on the instruction address register contents, the ISA instructions more quickly from the instruction cache rather than from system memory the next time the flow of the machine language program is such that the register holds the memory address of an ISA instruction present in the instruction cache. In particular, an instruction cache is accessed based on the memory address held in the instruction address register (e.g., IP), rather than exclusively based on a memory address specified by a load or store instruction. Thus, a dedicated data cache that holds ISA instructions as data—such as may be present in the hardware portion of a system that employs a software translator—that is accessed exclusively based on a load/store address but not by an instruction address register value is not an instruction cache. Furthermore, a unified cache that caches both instructions and data (i.e., that is accessed based on an instruction address register value and on a load/store address, but not exclusively based on a load/store address) is intended to be included in the definition of an instruction cache for purposes of the present disclosure.

Directing attention in particular to the branch unit pipeline of the microprocessor 10 of FIG. 1A, the microprocessor 10 comprises a pipelined microprocessor whose instruction set, in one embodiment, conforms substantially to the x86 architecture instruction set. As will be appreciated by persons having ordinary skill in the art from the description provided herein, the present invention may be implemented in a variety of various circuit configurations and architectures, and the architecture illustrated in FIG. 1A is merely one of many suitable architectures. The example microprocessor 10 comprises a quick predictor 12, branch target address cache (BTAC) 14, instruction byte queue (XIB) 16, a branch decoder 18, format instruction queue (FIQ)/loop queue 20, instruction translator 22, register alias table (RAT)/reservation stations (RS) 24, functional units (e.g., integer unit, floating point unit, etc.) 26, and a branch table update 28. Each of the numerically-referenced blocks of the microprocessor 10 correspond to logical circuits that are implemented over the corresponding plurality of stages C, I, B, U, L, M, F, G, W, X, E, S, W, Y, and Z, with the pipeline architecture enabling different groups of instructions at every stage. In one embodiment, four or more instructions may be run at every stage, with control signals marking each stage along the pipeline. Stages in association with the quick predictor 12, BTAC 14, and XIB 16 involve accesses to an instruction cache (I-cache, not shown in FIG. 1A).

The quick predictor 12 comprises a single cycle branch predictor that provides for single cycle prediction (e.g., takes one cycle to produce a target address, the prediction provided at the I stage in one embodiment). In one embodiment, the quick predictor 12 comprises a table (also referred to herein as array or target array) that stores branch target addresses of previously executed branch instructions, the table enabling a branch prediction when the stored branch instructions are subsequently encountered. In one embodiment, the table comprises 128 entries, though tables of other sizes (e.g., 64 entries, 32 entries, etc.) may be used in some embodiments. The table is organized as an n-way (e.g., n is an integer greater than one) set associative cache. Generally, an n-way set associative cache is also referred to herein as a multi-set associative cache. In one embodiment, each entry stores eight (8), 3-bit counters and the current local branch pattern, the counter chosen by a 3-bit local branch pattern. The quick predictor 12 further comprises a conditional branch predictor that is accessed in parallel with the table and that provides a taken/not taken direction for conditional branches. The quick predictor further comprises a return stack that can provide a target instead of the table. In one embodiment, the return stack comprises four (4) entries and provides the target for return instructions. Note that the specifications listed above are merely for illustration, and that some embodiments may perform under different specifications and hence are contemplated to be within the scope of the invention. The quick predictor 12 is configured to deliver a predicted branch target immediately (within a single cycle) with no taken branch penalty. In some embodiments, the quick predictor 12 may operate according to other specifications for its prediction mechanism and/or table configuration, or in some embodiments, may be omitted. Most branches are correctly predicted by the quick predictor 12. In some embodiments, where the quick predictor 12 provides a branch prediction that differs (e.g., difference in direction and/or target) from the branch prediction of the BTAC 14 based on the same fetched branch instruction, the BTAC 14 overrides the branch prediction of the quick predictor 12 and updates the quick predictor table within the set of stages of the BTAC 14, for instance, at the U stage, with the branch prediction information (e.g., direction, target address, branch prediction type) provided by the BTAC 14.

The I stage and/or B stage correspond to access to the various tables of the branch unit pipeline, including the I-cache, tag arrays, translation lookaside buffer (TLB) arrays, BTAC arrays, return stack arrays, etc., muxing out the direction or way (e.g., based on the tags), and reading out of the instructions.

The BTAC 14 holds information about previously executed branch instructions that it uses to predict the target address, direction, and type during subsequent executions. The BTAC 14 comprises one or more tables that are much larger than the table of the quick predictor 12. In one embodiment, the BTAC 14 comprises a 4k entry, m-way set-associative table (also referred to herein as array or target array), where m is an integer greater than one. Each entry of the BTAC 14 comprises a valid bit, a branch target address prediction, a direction prediction, and a branch type. In one embodiment, each entry additionally includes two tag bits referred to also herein as predictor mode bits. The predictor mode bits represent four (4) different privilege states that are also used by Intel®, as explained above. The branch type specifies whether the branch instruction is a call/return, indirect branch, conditional relative branch, or unconditional relative branch. In one embodiment, the BTAC 14 comprises or cooperates with a conditional relative branch predictor (or simply, conditional branch predictor) having a multiple entry (e.g., 12k) tagged geometric (TAGE)-based conditional branch predictor, multiple tables, a multi-bit (e.g., 3 bit), taken/not taken (T/NT) counter, and multi-bit global branch history. That is, the TAGE conditional branch predictor comprises tagged tables with geometrically increasing branch history lengths, as is known. As another example, the indirect prediction comprises a multiple entry (e.g., 1.5k) TAGE predictor and uses the table entries for static indirect branches. In one embodiment, two TAGE conditional branch predictors are used, one for side A and one for side B of a table. The TAGE conditional branch predictor may be part of the BTAC or used in conjunction with the BTAC 14.

In one embodiment, the BTAC 14 comprises or cooperates with a second type of conditional branch predictor of lower complexity than the TAGE conditional branch predictor, for instance a gshare predictor associated with side C of the table. The gshare conditional branch predictor may be a part of the BTAC 14 or used in conjunction with the BTAC 14. The gshare conditional branch predictor comprises a complexity in between that of the quick predictor 12 and the TAGE conditional branch predictors (e.g., approximately $\frac{1}{10}^{th}$ the size of the TAGE conditional branch predictor). In one embodiment, the gshare conditional branch predictor comprises a single table (e.g., m-bit global history register comprising a branch pattern of the last m executed branch instructions, where m is typically 10-12 bits though not limited to that quantity). The gshare conditional branch predictor uses a global branch history and a location (e.g., IP) of a branch instruction to create (via an XOR logical operation) an index into a table of counters (e.g., 2-bit counters), where the result of the index is a prediction for the current branch. As TAGE and gshare type conditional branch predictors are known in the art, further description of the same is omitted here for brevity. Note that in some embodiments, other types of prediction mechanisms may be used, including correlation-based prediction mechanisms, conditional branch predictors that use a combination of global and local branch history, etc. Further, though sides A, B, and C are emphasized herein, in some embodiments fewer or additional sides may be used. For each portion, or fetch quantum, of a cache line of the instruction cache (e.g., 16 bytes), the BTAC 14 can hold three entries (e.g., sides A, B, and C, though fewer sides may be used in some embodiments for storing prediction information for fewer branch instructions) that can hold prediction information for up to three branch instructions that may be present in a portion of the cache line. The BTAC 14 comprises operations through a set of stages (e.g., the I, B and U stages). In effect, the U stage of a branch instruction serves as a C stage for the target (e.g., the arrow from the B stage to the C stage reflects the situation of the branch instruction at the B stage and the next clock is the C stage of the target or herein also, the cache address), resulting in a two-clock delay for BTAC prediction.

The BTAC 14 has a two clock taken penalty, which also reveals a benefit of the quick predictor 12 in providing a rapid branch prediction (no taken penalty) by immediately steering the new cache address to be the target. In one embodiment, the BTAC 14, being larger than the quick predictor 12 and having a more sophisticated branch prediction mechanism, is configured to (e.g., always) override the branch prediction of the quick predictor 12 when there is a disagreement in branch prediction (e.g., the BTAC 14 determines a different branch prediction than the taken determination and/or branch target address determined by the quick predictor 12). In some embodiments, the BTAC 14 is configured to update the quick predictor 12 during one of the BTAC stages (e.g., the U stage) by writing the branch prediction information into the table of the quick predictor 12 (and also in the tables of the BTAC 14). In some embodiments, updates to the BTAC 14 are delayed until a branch is executed or retired, where the updates to the BTAC 14 involve writes to the predictor tables of the BTAC 14. In one embodiment, updates involve target information and/or counter updates. However, updates to the quick predictor 12 do not wait that long, occurring during a BTAC stage. Note that branches that are not in the quick predictor 12 are written into the quick predictor 12 two cycles later at a time corresponding to (e.g., during) a BTAC stage.

The XIB 16 is a queue of entries, each of which holds sixteen bytes of data from the instruction cache. For instance, the cache data that comes from the XIB 16 is simply a stream of instruction bytes that comes in sixteen byte blocks, and it is unknown where a given x86 instruction begins or ends within the stream or within a given block given that instructions are of variable length. The XIB 16 comprises known logic to determine and mark the beginning and ending byte of each instruction within the stream and thereby break up the stream of bytes into a stream of x86 instructions, which is provided to and stored in the FIQ/loop queue 20 for processing by the remainder of the microprocessor pipeline. In the L (length) stage, the XIB 16 determines the instruction lengths. In one embodiment, a predecoder (not shown in FIG. 1A) is implemented at the U stage, and is configured to detect potential branch instructions and mark them as such for each instruction byte in the queues. Notably, at this stage, there is ambiguity as to whether a given byte is the start of an instruction. If a byte is an opcode byte of a branch instruction determined at a later (M stage), then the instruction is affirmed as a branch instruction. For instance, the branch decoder 18 comprises an instruction mux (not shown) for muxing instructions in a mux or M stage, where the branch instructions are affirmed as such.

In the F stage, the instructions are formatted. In one embodiment, the formatted instructions comprise instructions conforming substantially to the x86 architecture instruction set. Also, a determination is made at the M stage whether a given instruction, perhaps marked preliminarily by the predecoder, was indeed a branch or not. For instance, where a miss occurred in the quick predictor 12 or BTAC 14 (e.g., at initial start-up), the branch decoder 18 (e.g., the instruction mux) decides the current instruction is a branch and redirects at stage G the cache address to the new target and update the tables in the front end of the microprocessor 10. In effect, the branch decoder 18 provides for branch prediction when missed at the quick predictor 12 or BTAC 14, where the branch instruction transitions to the target at the C stage. In some circumstances, such as where there are more than a limited or predetermined maximum number of branches per fetch (e.g., more than three per 16 byte fetch) at the BTAC 14, branch prediction for the extra branch is delayed until decode time.

The FIQ/loop queue 20 receives the formatted instructions and buffers them until they can be translated into microinstructions. The FIQ/loop queue 20 also provides for a preliminary decoding and fast looping function (e.g., on a BTAC loop branch, the loop queue is activated and loop instructions are repeatedly sent), the latter represented by the arrow at the right hand side of the block 20.

The W stage provides for an optional extra timing clock.

At the X stage, the instruction translator 22 translates (in the X or translate stage) the formatted instructions stored in the FIQ/loop queue 20 into microinstructions.

The instructions are provided in program order to a register alias table/reservation tables (RAT/RS) 24. The RAT functionality of the RAT/RS 24 maintains and generates dependency information for each instruction. The RAT functionality of the RAT/RS 24 renames the sources and destinations of the instructions onto internal registers, and dispatches the instructions to reservation stations of the RAT/RS 24, which issue the instructions, potentially out of program order, to functional units 26. The functional or execution units 26, which include integer units, execute branch instructions at stage E (execution). Execution units, branch units, and integer units are terms that are used interchangeably herein. In one embodiment, the execution units 26 (e.g., two execution units) execute two branches in a single clock cycle. The execution units 26 also indicate whether the BTAC 14 has correctly predicted the branch instruction.

Results of the execution are provided in one embodiment to a reorder buffer (not shown), which comprises information pertaining to instructions that have been executed. As is known, the reorder buffer keeps the original program order of instructions after instruction issue and allows result serialization during a retire stage. In one embodiment, some of the information of the reorder buffer may be stored elsewhere along the pipeline, such as at the decoder 18. Information stored in the reorder buffer may include branch information, such as type of branch, branch patterns, targets, the tables used in the prediction, and cache replacement policy information (e.g., least recently used or LRU).

The branch table update 28 comprises stages S, W, Y, and Z, and is configured to update (e.g., at the S stage) the various tables at the front end (e.g., BTAC, TAGE) with information about the fully decoded and executed branch instruction (e.g., the final result of the branch). The update may involve, at stages S, W Y, and Z, a table read, a target address write, and a counter increment or decrement, which may involve some delays. In one embodiment, the branch table update 28 provides an indication of a misprediction for a given conditional branch instruction and the side (e.g., A, B, or C) in which the conditional branch instruction is cached.

Figure 1B:
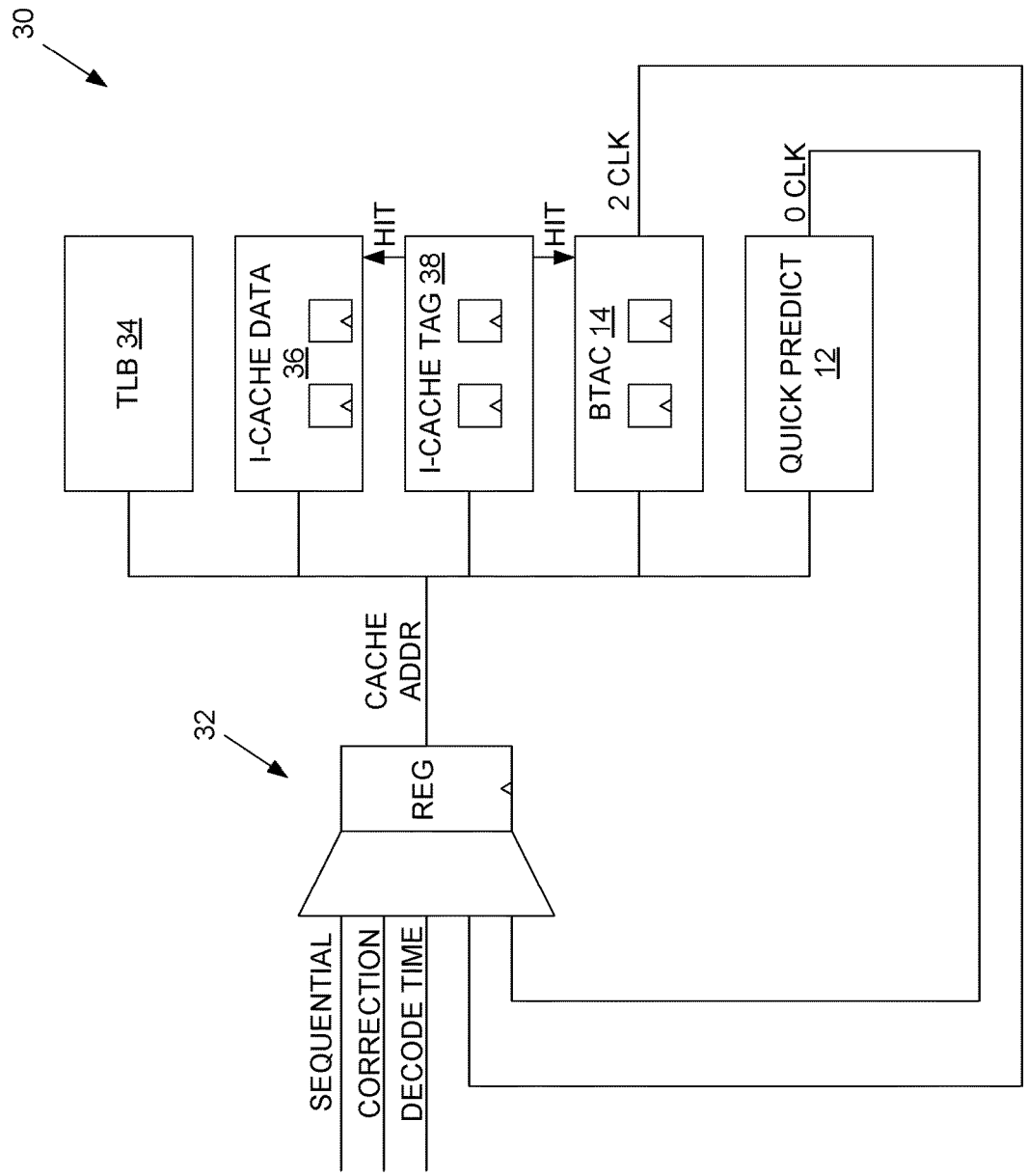
FIG. 1B is a schematic diagram showing an example front end of the branch unit pipeline shown in FIG. 1A.

Referring now to FIG. 1B, with continued reference to FIG. 1A, shown is an example quick predictor 12 and other example sources used at a front end 30 of the branch unit pipeline shown for the microprocessor 10 of FIG. 1A. The front end 30 comprises a fetch unit 32 (e.g., including a mux and clocked register), a translation lookaside buffer (TLB) 34, an instruction cache (I-cache data) 36, I-cache tag 38 (or tag array), the BTAC 14, and the quick predictor 12. The fetch unit 32 receives plural sources of cache instruction addresses, including a sequenced instruction address (e.g., from the I-stage), corrected instruction address (e.g., from the S stage), decode time instruction address (e.g., from the G stage), and addresses from the BTAC 14 and quick predictor 12. The output of the fetch unit 32 is a cache address that is provided as inputs to the TLB 34, I-cache data 36, I-cache tag 38, BTAC 14, and quick predictor 12 for accessing the next instruction of the I-cache data 36.

The TLB 34, under management by a memory management unit (not shown), provides for a virtual to physical page address translation as is known. That is, the TLB 34 stores the physical addresses of the most recently used virtual addresses. The TLB 34 receives a linear address from a segmentation unit (which converts the logical address from a program into the linear address), and a portion of the linear address is compared to the entries of the TLB 34 to find a match. If there is a match, the physical address is calculated from the TLB entry. If there is no match, a page table entry from memory is fetched and placed into the TLB 34.

The I-cache data 36 comprises a level 1 cache of instructions that have been fetched or prefetched from L2, L3 or main memory. The I-cache data 36 comprises multiple clocked registers.

The I-cache tag 38 comprises an array of tags corresponding to the instructions in the I-cache data 36, and comprises multiple clocked registers, and is used to determine a match between information associated with the fetched cache instruction (e.g., the tag or portion of the cache address) to the I-cache data 36 and BTAC 14.

The BTAC 14 is explained above in association with FIG. 1A, and has multiple clocked registers and a two (2) clock taken penalty. The quick predictor 12, also explained above, has a zero (0) clock taken penalty. For instance, assume fetches along the I-cache at 16 bytes per cycle, and assume a branch instruction at cache address 20 to cache address 95. Note that hexadecimal notation (e.g., 0x0, 0)(10, 0x20, etc.) is implied by the address descriptions in this example. Thus, fetches occur at cache address 0, cache address 10, cache address 20 (the branch instruction, but not yet resolved since the BTAC 14 read and mux span multiple cycles, which in some embodiments is the same timing as the I-cache), cache address 30 (relative clock 1), cache address 40 (relative clock 2), and then on the 3rd clock (relative clock 3), the cache instruction fetch is redirected to cache address 95. The taken branch penalty thus comprises two clock cycles in this example, since cache address 30 and 40 occur after the branch. In other words, without the quick predictor 12, the taken branch penalty is always two clocks for this particular design example. With the smaller and faster quick predictor 12, the cache address fetches, in the above example, comprise 0, 10, 20 and 95, with no delay on the cache address and zero taken penalty. As noted above, in some embodiments, the quick predictor 12 may be omitted.

Before commencing a more detailed description of certain embodiments of a branch prediction security system, a further explanation of the Spectre vulnerabilities follows. In general, the vulnerabilities or security flaws may be understood in the context of user programming code and supervisory programming code. The supervisory code refers to code that requires a higher privilege or security authorization to access, including code pertaining to password provisions, privacy data, etc. often used in websites or operating systems intended only for privileged access (e.g., by those having proper security credentials (e.g., administrators of a website or cloud computing service)). Supervisory code may include kernel code involved in an operating system or a hypervisor. User code on the other hand, is code that may be run by a user and has a lower privilege requirement than supervisory code. User code should not be able to access supervisory code. At the hardware level, the chip enforces a security protocol to prevent access from a lower privilege level to a higher privilege level (e.g., between users and/or applications). The Spectre security flaws can exploit the speculative branch prediction mechanisms in a chip through inferring the nature of data from timing patterns to access data, and more specifically, exploiting indirect branch prediction mechanisms. Mitigation techniques such as IBPB and even IBRS clear indirect branch instructions out of, for instance, the BTAC when transitioning from lower (user code) to higher (supervisory) privilege code. For instance, when transitioning to, or from, the supervisor code or mode, the indirect branches are cleared. In another technique, referred to as retpoline, every indirect branch is replaced with a return target. However, as explained above, indirect branch clears may compromise performance given the size, ways arrangement, and mix of branch types in a prediction table. Further, retpoline is implemented at the compiler, where except perhaps with embedded applications with a limited software library, changing code is much more involved give the extent and scope of software applications when compared to a hardware fix.

Figure 2:
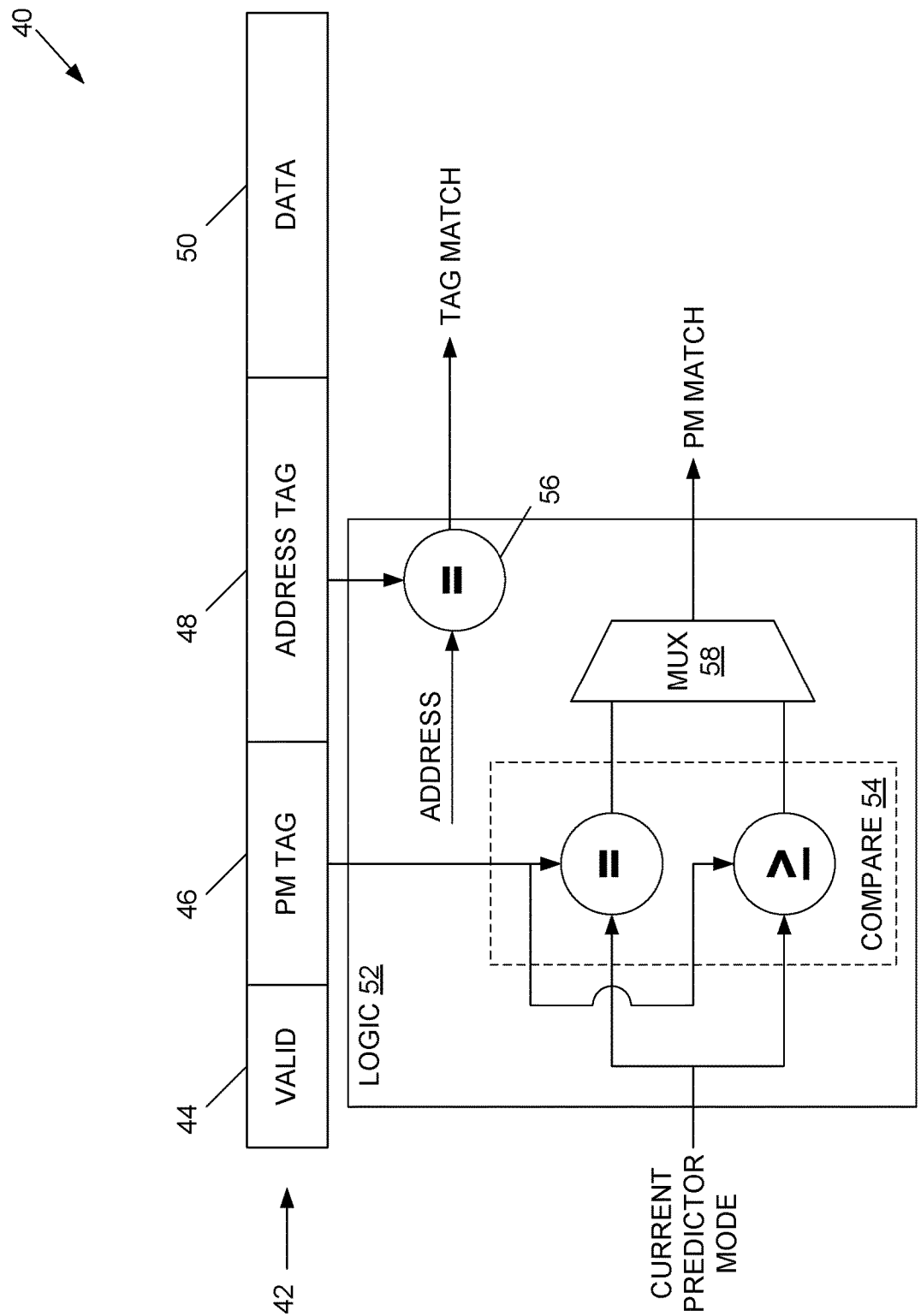
FIG. 2 is a schematic diagram that shows an embodiment of example branch prediction security system based in part on indirect branch restricted speculation (IBRS) mitigation techniques of a Spectre variant II vulnerability.

Given the additional background above, attention is now directed to FIG. 2, which shows an embodiment of example branch prediction security system 40 based in part on indirect branch restricted speculation (IBRS) mitigation techniques of a Spectre variant II vulnerability. In general, the branch prediction security system 40 prevents user code from affecting supervisory code. More particularly, there are two variations to the methods implemented by the branch prediction security system 40. One variation is that privilege level (or equivalently, predictor mode) has to exactly match, and the other variation is that lower privilege code cannot affect higher privilege code. In one embodiment, the branch prediction security system 40 comprises a BTAC 14 (though in some embodiments, other branch prediction table types may be used), and a BTAC entry 42 comprises a valid entry 44, a predictor mode (PM) tag 46 (or privilege level tag), an address tag 48, and a data entry 50. The valid entry 44 comprises a 1-bit setting that indicates if the branch instruction in the BTAC 14 is valid. The predictor mode tag 46 comprises a 2-bit value corresponding to any one of four (4) privilege levels. The address tag 48 and data entry 50 correspond to an address identifier or index for the branch instruction and the branch information or data, respectively.

The branch prediction security system 40 further comprises logic 52 that is used to receive information from select entries of the BTAC entry 42, and enforce security by invalidating branches that do not meet certain privilege level conditions. The logic 52 is a part of, or works in cooperation with, the BTAC 14 in some embodiments. The logic 52 comprises comparator logic 54 and 56, and a mux select 58. In one embodiment, the comparator logic 54 receives the current predictor mode of a fetched branch instruction (e.g., indirect branch instruction) and the PM tag 46, and performs a privilege level check. The privilege level check determines whether the current predictor mode is equal to the PM tag 46 and whether the predictor mode is greater than or equal to the PM tag 46 (e.g., the lower privilege code cannot affect a higher privilege code), and when met, the mux select 58 is triggered to provide an output of a PM match. This operation is performed along with a tag match. Namely, the comparator logic 56 receives the fetch address and the address tag 48, and provides a tag match when these values are equal. In effect, the conditions that result in a hit in the BTAC 14 include a valid tag 44, a tag match from the comparator logic 56, and a PM match from the mux select 58. Conversely, access is denied between code of different privilege levels by causing a miss (and hence not predicted) upon failure of the privilege test. Notably, unlike conventional fixes where microcode is used to clear a predictor for every change in code privilege level, certain embodiments of the branch prediction security system 40 retain the branches, yet the branches that are retained are only accessible when at the same privilege level. It should be appreciated by one having ordinary skill in the art, in the context of the present disclosure, that the arrangement of components depicted in FIG. 2 is an example embodiment, and that in some embodiments, similar functionality may be achieved using other arrangements of components and hence are contemplated to be within the scope of the disclosure.

Figure 3:
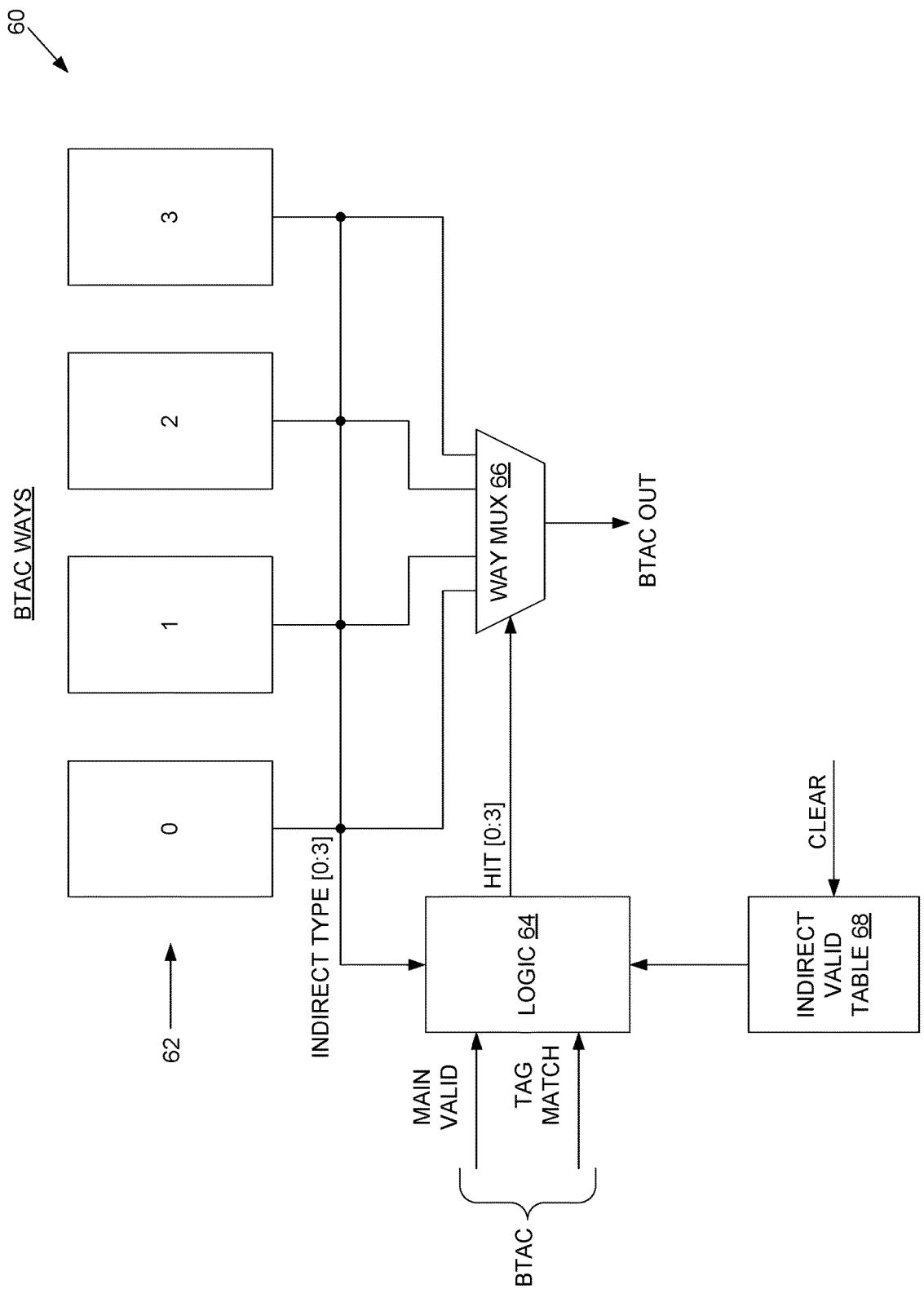
FIG. 3 is a schematic diagram that shows an embodiment of example branch prediction security system based in part on indirect branch predictor barrier (IBPB) mitigation techniques of a Spectre variant II vulnerability.

Referring now to FIG. 3, shown is an embodiment of example branch prediction security system 60 based in part on indirect branch predictor barrier (IBPB) mitigation techniques of a Spectre variant II vulnerability. As indicated above, IBPB is implemented by the branch prediction security system 60 by clearing indirect branches out of the branch prediction table (e.g., BTAC 14) when transitioning from lower to higher privilege code. In one embodiment, the branch prediction security system 60 performs this function by using a separate indirect valid table, as explained below. The branch prediction security system 60 comprises multiple ways (table entries) 62, and in this example, four (4) BTAC ways 0, 1, 2, and 3 (e.g., for each of sides A, B, C, etc.). It should be appreciated that in some embodiments, fewer or additional BTAC ways 62 may be used, and hence are contemplated to be within the scope of the disclosure. The branch prediction security system 60 further comprises comparator logic 64, a way mux 66, and an indirect valid table 68. The indirect valid table 68 stores a valid bit entry (e.g., an indirect valid bit entry) for the indirect branch instructions of the BTAC 14. The indirect valid table 68 is much smaller than the BTAC 14, where in one embodiment, each entry is a single bit in length. The indirect valid table 68 may be cleared in a single clock. As should be appreciated by one having ordinary skill in the art in the context of the present disclosure, a clearing of the indirect valid table 68 may simply use a normal signal. The single clock clearing of all entries is made possible by the low power/current constraints of such a small table (e.g., containing only indirect valid bits), with sufficient current used to enable concurrent clearing of all of the bits of the table.

Explaining further, in one embodiment, the indirect valid table 68 comprises plural rows and one or more entries for each row. For instance, the indirect valid table 68 comprises a physical arrangement of sixty-four (64) rows×sixteen (16) bits, wherein each of the bit entries (e.g., columns) comprises a register and driver (to provide the needed current) to latch and distribute a clear bus (e.g., 16-bits) to all the random access memory (e.g., SRAM) cells in the table 68. The entries may be cleared individually or the entire table may be cleared at once (e.g., in a single clock cycle) using, for instance, a transistor per cell that clears the memory state of the cell to zero when activated by a clear signal. When the clear signal is not activated, the cell performs as a normal SRAM cell. The 64 row×16 bit table is further muxed to logically produce an indirect valid table configuration. In one embodiment, the indirect valid table 68 comprises a 512×2 bit table, with one bit entry associated with a main valid and the other entry associated with the indirect valid. In some embodiments, the mux may result in a 512×1 bit table, where each entry is associated with only the indirect valid (and the main valid an entry in the BTAC 14).

The BTAC ways 62 provide a respective output to the way mux 66, and to the comparator logic 64. In one embodiment, the comparator logic 64 receives from the BTAC ways 62 an indication of the branch type (e.g., indirect branch, 4 bits) and also receives from the BTAC 14 (e.g., from an entry of the BTAC 14 for a fetched branch instruction), in one embodiment, a main valid entry and an address tag match. A further input to the comparator logic 64 is an indirect valid entry from the indirect valid table 68. The comparator logic 64 provides an indication of a hit to the way mux 66, where a hit corresponds to a main valid, an indirect type that has an indirect valid (e.g., as provided via the indirect valid table 68), and an address tag match. On the other hand, when the indirect valid table 68 is cleared, regardless of the valid entry of the BTAC 14 (e.g., valid or invalid), the BTAC entry is still treated as invalid based on the cleared indirect valid table entries. In other words, upon a read of the BTAC 14, it may be determined (e.g., by the comparator logic 64) that there is an indirect branch type for a main valid at a given address tag, but if the input from the indirect valid table 68 indicates an indirect invalid bit, then the indirect branch instruction is invalid, preventing its use after the transition from user code to privilege or supervisory code (and hence preventing malicious code from using the indirect branch instruction to exploit a Spectre-type security flaw). In effect, the indirect valid table 68 enables a second valid bit entry (in addition to the main or BTAC valid entry, or main valid entry in the indirect valid table in some embodiments as explained above) to be read out, in parallel with the BTAC 14, and that is designed to be clearable in a single cycle, avoiding the performance hit expected from a clearing of the indirect branches from the much larger BTAC 14. A hit that is produced from a main valid, indirect type branch instruction, indirect valid, and address tag match is provided to the way mux 66, and a BTAC output is produced (e.g., with information including the branch instruction at a particular address, a particular way, a side, a target, a type of branch instruction). It should be appreciated by one having ordinary skill in the art, in the context of the present disclosure, that the arrangement of components depicted in FIG. 3 is an example embodiment, and that in some embodiments, similar functionality may be achieved using other arrangements of components and hence are contemplated to be within the scope of the disclosure.

It should be appreciated by one having ordinary skill in the art in the context of the present disclosure that some embodiments of a microprocessor may be configured to perform both approaches (IBRS and IBPB-based embodiments), and some embodiments may only be able to perform one or the other approaches.

Figure 4:
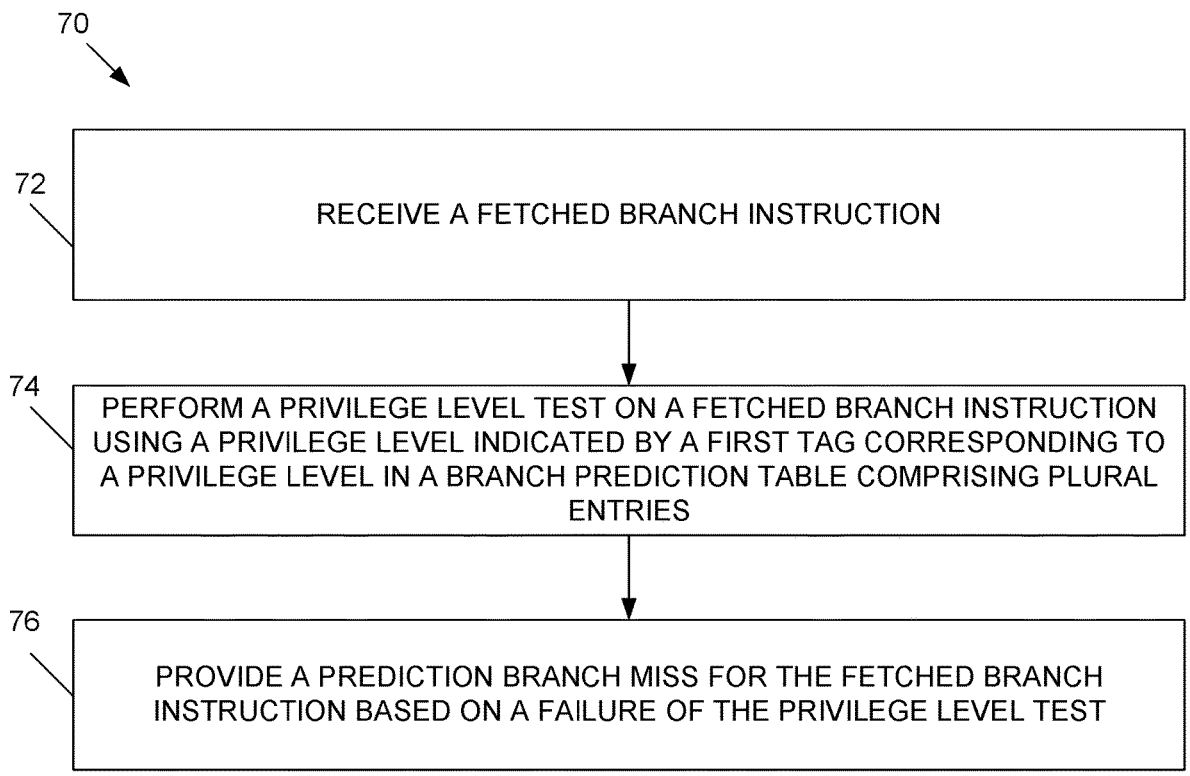
FIG. 4 is a flow diagram that shows an embodiment of an example IBRS-based, branch prediction security method.

Having described certain embodiments of a branch prediction security system 40, it should be appreciated that one embodiment of an example branch prediction security method implemented in a microprocessor and based on IBRS, denoted as method 70 in FIG. 4, comprises: receiving a fetched branch instruction (72); performing a privilege level test on a fetched branch instruction using a privilege level indicated by a first tag corresponding to a privilege level in a branch prediction table comprising plural entries, each of the plural entries comprising a tag corresponding to a privilege level (74); and providing a prediction branch miss for the fetched branch instruction based on a failure of the privilege level test (76).

Figure 5:
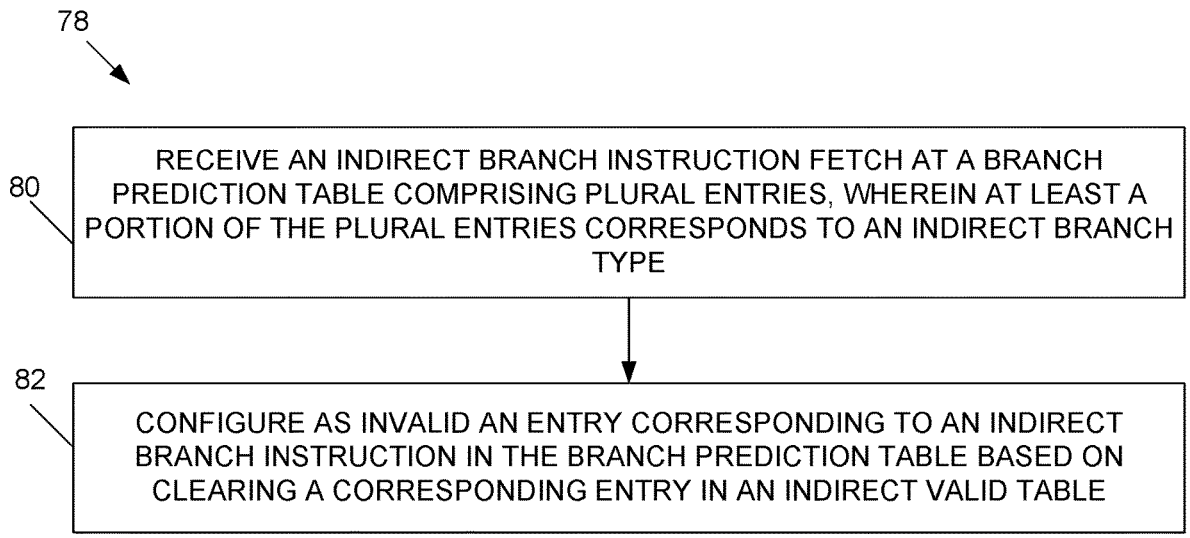
FIG. 5 is a flow diagram that shows an embodiment of an example IBPB-based, branch prediction security method.

Having described certain embodiments of a branch prediction security system 60, it should be appreciated that yet another embodiment of an example method implemented in a microprocessor and based on IBPB, denoted as method 78 in FIG. 5, comprises: receiving an indirect branch instruction fetch at a branch prediction table comprising plural entries, wherein at least a portion of the plural entries corresponds to an indirect branch type (80); and configuring as invalid an entry corresponding to an indirect branch instruction in the branch prediction table based on clearing a corresponding entry in an indirect valid table (82).

Any process descriptions or blocks in flow diagrams should be understood as representing modules, segments, logic, or portions of code which include one or more executable instructions for implementing specific logical functions or steps in the process, and alternate implementations are included within the scope of the embodiments in which functions may be executed out of order from that shown or discussed, including substantially concurrently or in different order, depending on the functionality involved, as would be understood by those reasonably skilled in the art of the present disclosure.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

Note that various combinations of the disclosed embodiments may be used, and hence reference to an embodiment or one embodiment is not meant to exclude features from that embodiment from use with features from other embodiments. In the claims, the word "comprising" does not exclude other elements or steps, and the indefinite article "a" or "an" does not exclude a plurality.

At least the following is claimed:

1. A microprocessor, comprising:
a branch prediction table comprising plural entries, wherein a first portion of the plural entries corresponds only to an indirect branch type and a second portion of the plural entries corresponds to one or more other branch types;
an indirect valid table;
logic configured to configure only plural entries of the first portion corresponding to indirect branch instructions in the branch prediction table as invalid through clearance of corresponding plural entries in the indirect valid table; and
logic configured to clear the plural entries of the indirect valid table in a single clock cycle.

2. The microprocessor of claim 1, wherein each entry of the plural entries of the first portion corresponding to the indirect branch instructions comprises a valid bit entry, wherein the valid bit entry in the branch prediction table is valid or invalid.

3. The microprocessor of claim 1, wherein the invalid configuration of the plural entries of the first portion of the branch prediction table prevents branch prediction corresponding to the plural entries of the first portion after transitioning from a lower privilege code level to a higher privilege code level.

4. The microprocessor of claim 1, wherein a predicted target of at least one of the indirect branch instructions is manipulated by malicious code as part of a Spectre vulnerability attack.

5. The microprocessor of claim 1, wherein the branch prediction table and the indirect valid table are read in parallel.

6. The microprocessor of claim 1, wherein a branch prediction table hit for an indirect branch instruction is based on an address tag match of the branch prediction table, a main valid bit in either the branch prediction table or the indirect valid table, and an indirect valid bit in the indirect valid table.

7. The microprocessor of claim 6, further comprising a branch prediction table way mux, wherein an indication of the branch prediction table hit selects an output of the branch prediction table.

8. The microprocessor of claim 7, wherein the output comprises a branch target and a branch type.

9. The microprocessor of claim 1, wherein the branch prediction table comprises a branch target address cache (BTAC).

10. The microprocessor of claim 1, wherein the invalidation of the plural entries of the first portion based on the clearance of the corresponding plural entries in the indirect valid table does not affect a valid or invalid configuration of any entry or entries of the second portion.

11. A method implemented in a microprocessor, the method comprising:
predicting targets of indirect branch-instructions using a branch prediction table comprising plural entries, wherein a first portion of the plural entries corresponds only to an indirect branch type and a second portion of the plural entries corresponds to one or more other branch types;
configuring as invalid only plural entries of the first portion corresponding to indirect branch instructions in the branch prediction table based on clearing corresponding plural entries in an indirect valid table; and
clearing the plural entries of the indirect valid table in a single clock cycle.

12. The method of claim 11, wherein each entry of the plural entries of the first portion corresponding to the indirect branch instructions comprises a valid bit entry, wherein the valid bit entry in the branch prediction table is valid or invalid.

13. The method of claim 11, wherein the invalid configuration of the plural entries of the first portion of the branch prediction table prevents branch prediction corresponding to the plural entries of the first portion of the branch prediction table after transitioning from a lower privilege code level to a higher privilege code level.

14. The method of claim 11, wherein a predicted target of at least one of the indirect branch instructions is manipulated by malicious code as part of a Spectre vulnerability attack.

15. The method of claim 11, further comprising reading in parallel the branch prediction table and the indirect valid table.

16. The method of claim 11, wherein a branch prediction table hit for an indirect branch instruction is based on an address tag match of the branch prediction table, a main valid bit in either the branch prediction table or the indirect valid table, and an indirect valid bit in the indirect valid table.

17. The method of claim 16, further comprising outputting from the branch prediction table based on providing an indication of the branch prediction table hit to a way mux fed by the branch prediction table.

18. The method of claim 17, wherein the output comprises a branch target and a branch type.

19. The method of claim 11, wherein the branch prediction table comprises a branch target address cache (BTAC).

20. The method of claim 11, wherein the invalidation of the plural entries of the first portion based on the clearance of the corresponding plural entries in the indirect valid table does not affect a valid or invalid configuration of any entry or entries of the second portion.

* * * * *